United States Patent [19]

Pacher

[11] Patent Number: 5,211,693
[45] Date of Patent: May 18, 1993

[54] DRILLING AND CHIPPING TOOL

[75] Inventor: Vinko Pacher, Munich, Fed. Rep. of Germany

[73] Assignee: Hilti Aktiengesellschaft, Schaan, Liechtenstein

[21] Appl. No.: 797,459

[22] Filed: Nov. 22, 1991

[30] Foreign Application Priority Data

Nov. 22, 1990 [DE] Fed. Rep. of Germany ....... 4037148

[51] Int. Cl.⁵ .......................................... B23B 31/113
[52] U.S. Cl. ..................... 279/19.3; 279/89; 279/904; 408/239 R
[58] Field of Search ............... 279/19, 19.3, 19.6, 279/19.7, 89-91, 158, 904, 905; 468/238, 239 R, 239 A, 240, 241 R

[56] References Cited

U.S. PATENT DOCUMENTS 1,866,863  7/1932  Richardson ..................... 279/19.6

FOREIGN PATENT DOCUMENTS 68126   12/1948  Denmark ............................ 279/1 B
0379009  7/1990  European Pat. Off. ............ 279/1 B

*Primary Examiner*—Steven C. Bishop
*Attorney, Agent, or Firm*—Kill, Olick & Oshinsky Anderson

[57] ABSTRACT

A drilling and chipping tool (1) has a holder (3) detachably connectable on a neck (2) on the tool (1) and the holder (3) includes a cap (4) arranged to fit over the neck (2). The tool (1) has a long direction and the cap (4) has teeth (5, 5a) on an interior surface detachably engageable with teeth (2a) on an exterior surface of the neck (2). A part (5a) of the interior teeth (5, 5a) on the cap (4) is offsettable relative to the remaining teeth (5) on the cap (4) and is engageable into at least one recess (2b) in the region of the teeth (2a) on the neck, whereby a tolerance free connection is established between the holder (3) and the neck (2) of the tool (1). The holder (3) can be attached and detached from the neck (2) without the use of any other tools.

6 Claims, 3 Drawing Sheets

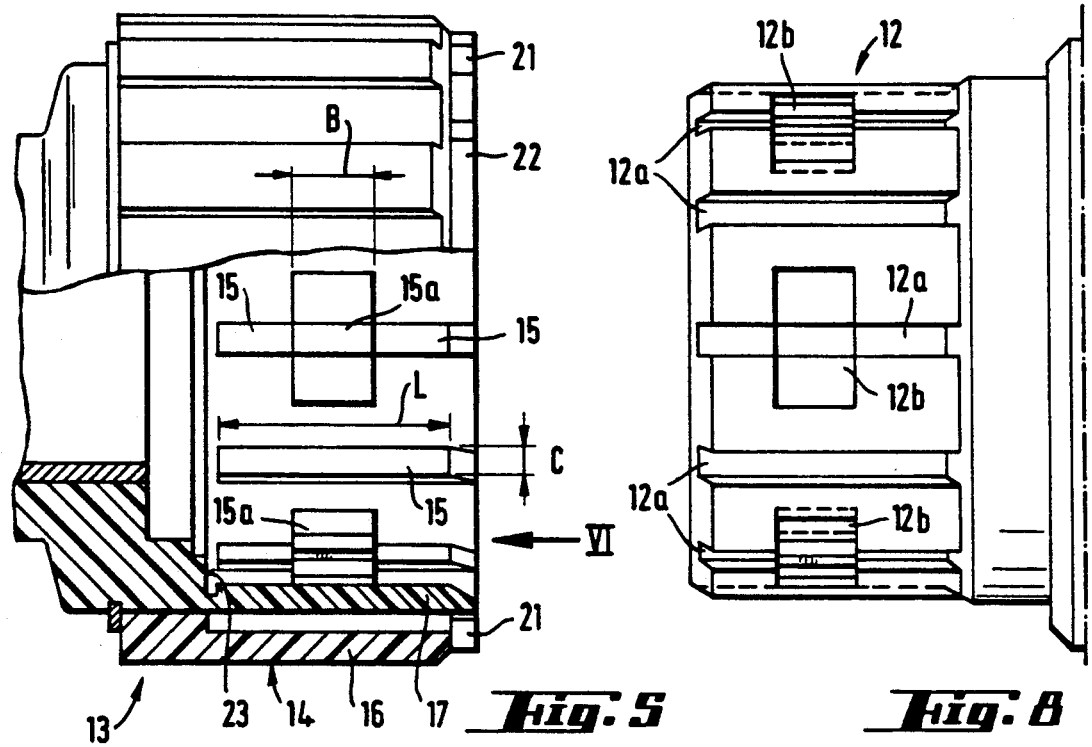
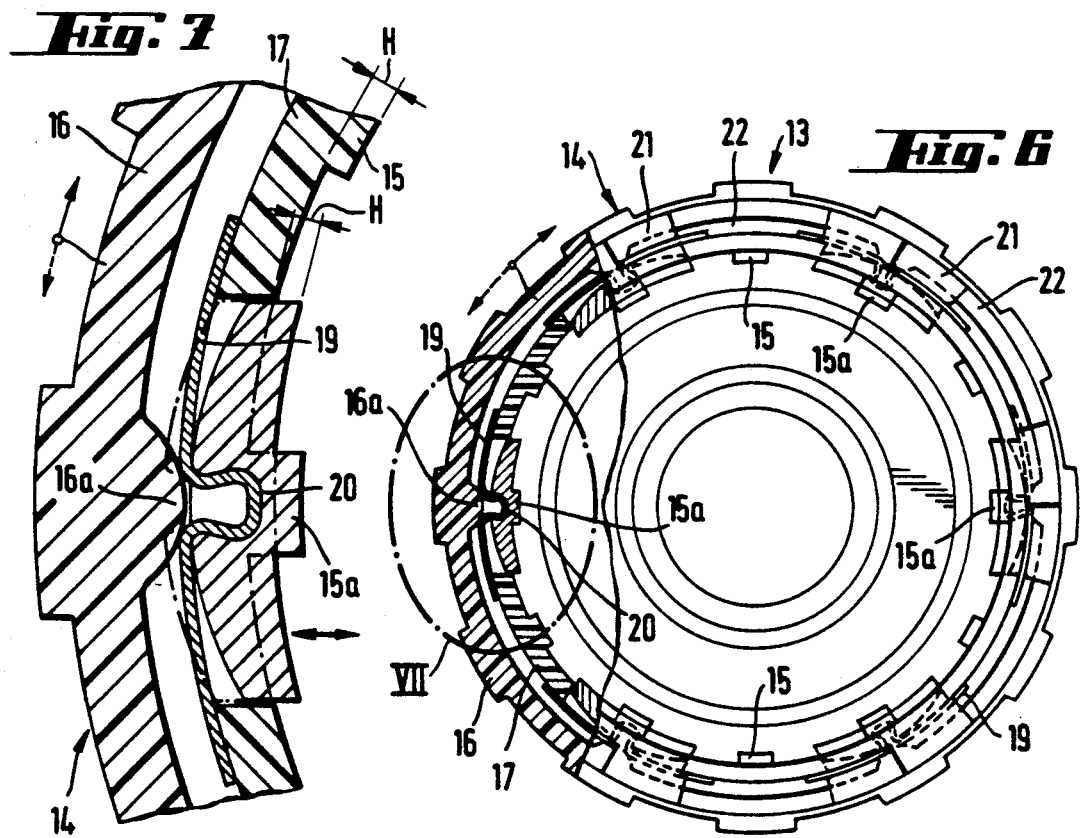

DRILLING AND CHIPPING TOOL

BACKGROUND OF THE INVENTION

The invention is directed to a drilling and chipping tool with a holder for a tool bit detachably connected to a neck on the drilling and chipping tool. The holder has a cap arranged to fit over the neck of the tool.

Drilling and chipping tools of the type under consideration are distinguished by a light, easily handled construction. For the most part, such tools are used for drilling in steel, timber, plastics material and, in combination with a striker mechanism, for drilling in rock. In these drilling and chipping tools it is possible to switch off the striking operation, however, the rotary drive continues.

A tool bit holder is disclosed in DE-PS 36 37 354 and is shaped as a separate striker-front adapter chuck. This chuck includes a cap so that it can be clamped on the neck of a machine tool. Tool bit holders of this type have the disadvantage that the cap must be placed on the neck of the tool and subsequently tightened in the circumferential direction by a tightening screw or locking bar.

When the tool is lifted off a component or target material being worked on, the blows generated by a striker piston of the tool acting in the axial direction are absorbed entirely by the striker-front adapter chuck. As a result, the cap of the holder can slid off the tool neck. To prevent such an occurrence, a clampening screw must be tightened to such a high degree that there is the possibility of damage or deformation to the tool neck.

SUMMARY OF THE INVENTION

Therefore, it is the primary object of the present invention to provide a drilling and chipping tool with a holder for a tool bit connected securely, detachably, and in a damage free manner with the neck of the tool.

In accordance with the present invention, the holder for the tool bit includes a cap with teeth formed in an interior surface and extending in the long direction of the tool and the neck on the tool has a complementary set of teeth extending in the long direction on its exterior surface, and a part of the interior set of teeth in the cap is offsettable relative to the remainder of the teeth and engages into at least one recess in the region of the exterior teeth on the tool neck.

Accordingly, due to the arrangement of the present invention, it is possible to fasten the holder for the tool bit to the neck of the tool without any additional instruments or tools by simply turning a ring on the holder in the circumferential direction of the holder. Axial blows generated by the striker piston are absorbed by the offsettable part of the interior set of teeth without any movement of the holder in its axial direction or in the long direction of the tool.

In another embodiment of the invention, the offsettable part of the teeth in the interior of the cap relative to the remainder of such teeth is rotatable in the circumferential direction and can move into a corresponding recess in the region of the matching exterior teeth on the tool neck. Preferably, the amount of movement of the offsettable part in the circumferential direction corresponds to the width in the circumferential direction of one tooth. When turning the offsettable part through the width of one tooth, the entire crosssectional surface of the tooth assumes the maximum load acting in the axial direction, that is, in the long direction of the tooth. If the extent of movement in the circumferential direction is less than the width of the tooth, only a portion of the cross-sectional surface of the tooth carries the load. To avoid damage, the force of the load must be reduced in such a case.

In another preferred embodiment of the invention the offsettable part of the interior teeth in the cap are distributed around the circumferential direction of the cap. In this arrangement, a single tooth may be offset, however, preferably each tooth in the interior of the cap can have an offsettable part.

In this embodiment, the offsettable part of the interior teeth is advantageously movable in the radial direction. Thus, a part of the interior teeth is moved radially inwardly toward the axis of the holder and engages into appropriate recesses in the region of the complementary arranged exterior teeth on the neck of the tool. The amount of the radial movement of the offsettable part of the interior teeth advantageously corresponds to the tooth height or dimension in the radial direction. With this arrangement the wall thickness of the cap is maintained small in the region of the mechanical lock or latch. With a smaller tooth height, the cross-sectional surface of the tooth is correspondingly smaller. The load acting on the tooth must, therefore, be reduced accordingly.

The dimension of the offsettable part in the long direction of the tool corresponds preferably to one third of the overall tooth dimension in the long direction.

The various features of nqvelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is another embodiment of the holder displayed in an enlarged partly sectioned side elevational view with parts of interior teeth in the holder being radially displaceable;

FIG. 6 is an end view, partly in section, of the holder in the locked position and taken in the direction of the arrow VI in FIG. 5;

FIG. 7 is an enlarged sectional of the part of the holder shown in FIG. 6 enclosed in dot dash line VII; and FIG. 8 is a side elevational view of the neck of the drilling and chipping tool arranged to receive the holder illustrated in FIGS. 5-7.

DETAILED DESCRIPTION OF THE INVENTION

Figure 1:
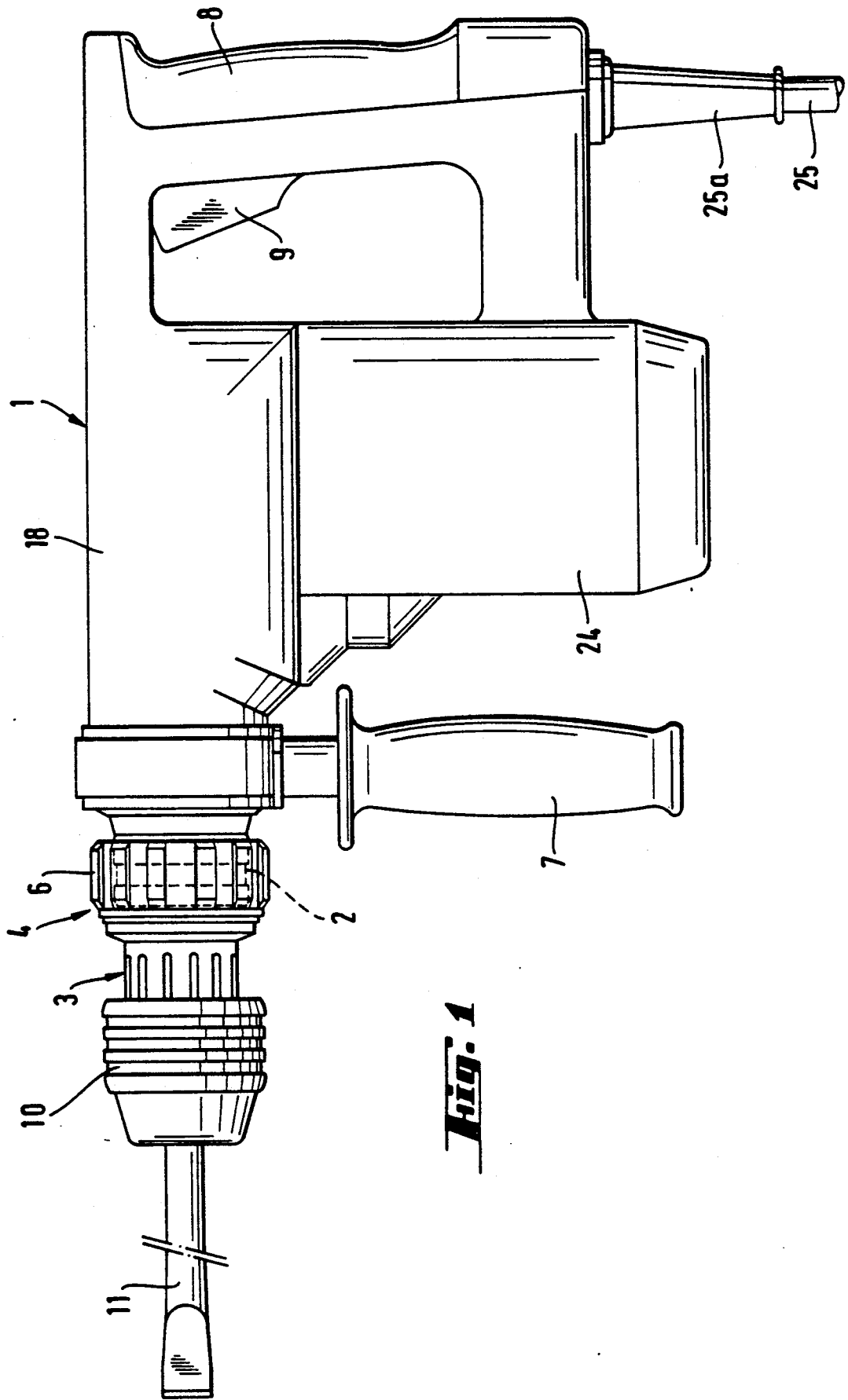
FIG. 1 is an elevational view of a drilling and chipping tool with a holder containing a tool bit and detachably connected to the tool.

In FIG. 1 a drilling and chipping tool 1 is shown including a neck 2 at its leading end arranged to receive a detachable holder 3 for a tool bit. The tool 1 has the leading end with the neck 2 thereon, a trailing end, and the tool has a long direction extending in the trailing end-leading end direction. A tool bit 11 in the form of a flat chisel or chipper is held in the holder 3 on the leading end of the tool 1. On the trailing end side of the neck 2 there is a side handle 7 shown extending downwardly from the tool. The handle 7 can be pivoted around the tool neck 2 and can be secured in a desired position.

Another handle 8 is located at the trailing end of the drilling and chipping tool 1 and contains an actuation switch or trigger 9. The drilling and chipping tool is operated by means of the switch 9.

A current supply cable 25 is attached through an elastic socket 25a to the handle 8 of the tool 1. An electrical drive 24 and a striker mechanism 18 are located within the tool 1 but are not shown in detail. The reference numerals 24 and 18 merely indicate the position of these parts within the tool housing.

Holder 3 is detachably connected on the neck 2 of the drilling and chipping device 1. The holder 3 comprises a tool bit receptacle 10 at its leading end and a cap 4 at its trailing end.

Figure 2:
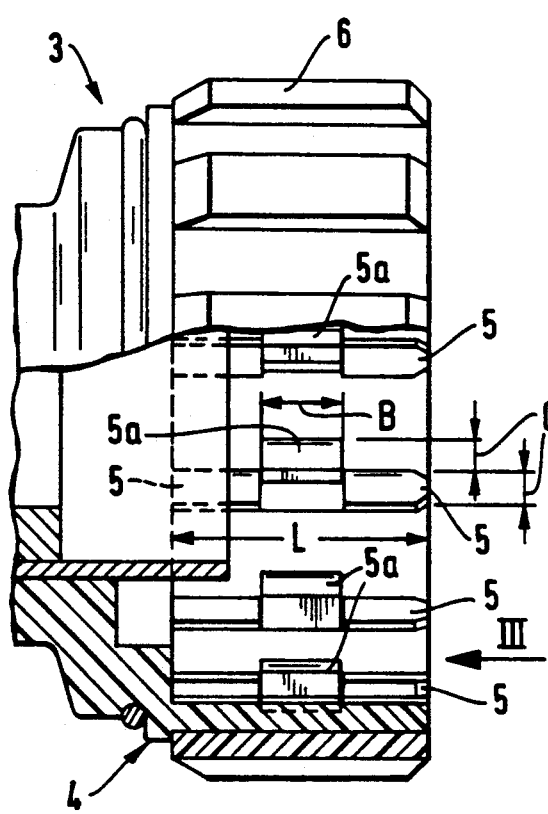
FIG. 2 is an enlarged side elevational view of a cap on the holder displayed in FIG. 1, illustrated partly in section; and parts of interior teeth in the holder are offsettable in its circumferential direction.
Figure 4:
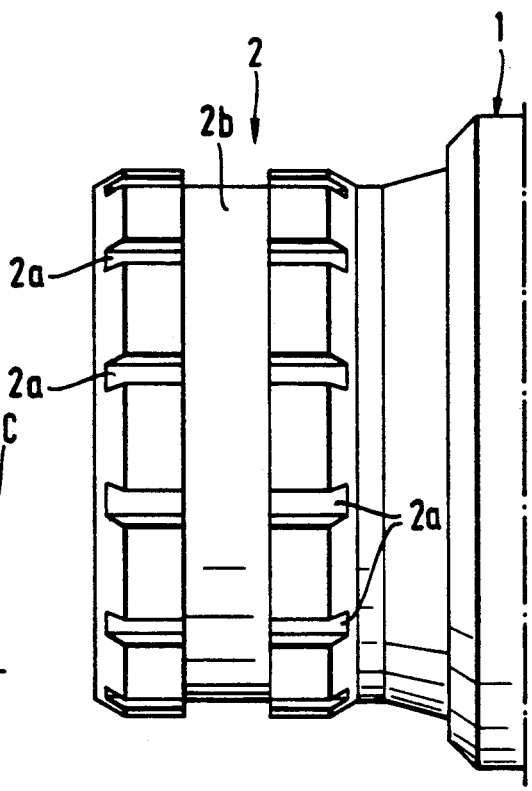
FIG. 4 is a side elevational view of a neck of the drilling and chipping tool arranged to receive the holder illustrated in FIGS. 2 and 3.
Figure 3:
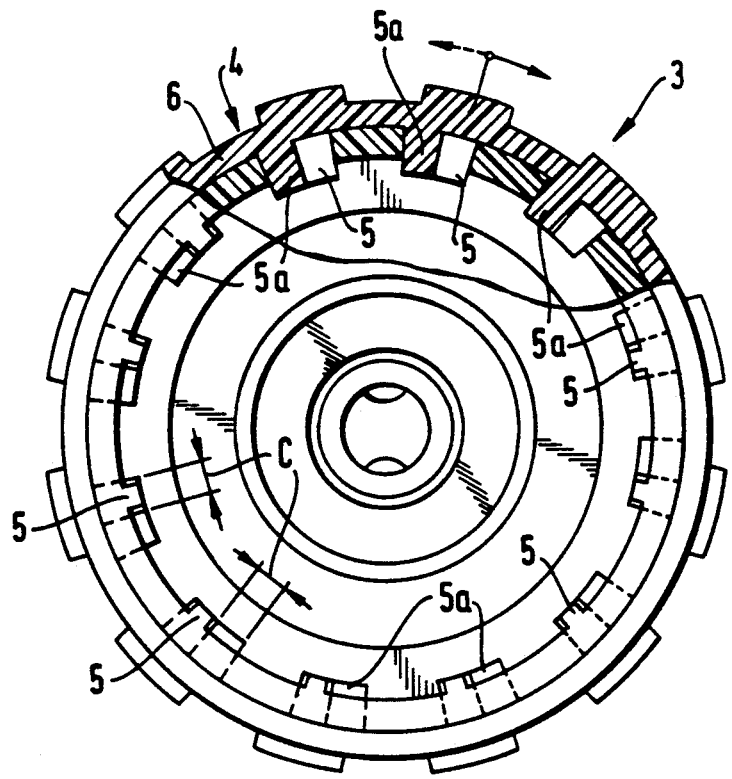
FIG. 3 is an end view, partly in section, of the holder shown in FIG. 2 with the view taken in the direction of the arrow III in FIG. 2.

As shown in FIGS. 2-4, the cap 4 has teeth 5, 5a on its interior annular surface and the teeth extend in the long direction of the tool. The neck 2 of the tool 1 has teeth 2a also extending in the long direction and arranged to match the interior teeth 5, 5a on the cap 4. During assembly, the cap 4 of the tool bit holder 3 is slid over the teeth 2a on the neck 2.

After the holder 3 is completely slid onto the neck 2, at least a part 5a of the teeth 5, 5a is moved in the circumferential direction. This circumferential displaced part 5a of the teeth 5, 5a engages in a recess 2b in the neck 2 and locks the holder 3 on the tool 1. To displace the offsettable parts 5a of the teeth, in the circumferential direction, the cap 4 is provided with an external ring or annulus 6 rotatable in the circumferential direction with regard to the other interior teeth 5. The offsettable parts 5a of the interior teeth 5, 5a are connected to the ring 6 or are displaceable by the ring. By rotating the ring about the axial or long direction of the cap 4 the offsettable parts or the interior teeth 5a are moved in the circumferential direction.

The holder 3 is formed in part of plastics material with the other parts made up essentially of aluminum or rubber.

FIG. 3 is an end view of the holder 3 taken in the direction shown by the arrow III in FIG. 2. In FIG. 3 a portion of the cap 4 is shown sectioned. The teeth 5, 5a have a width C measured in the circumferential direction. The offsettable parts of the teeth, that is the interior teeth 5a, have a length B, note FIG. 2, corresponding to one third of the entire length L of the interior teeth 5, 5a with the offsettable teeth 5a centered in the cap 4 and located in the central third of the cap.

The cross-section of the teeth 5, 5a on the holder 3 as well as the cross-section of exterior teeth 2a on the neck 2 can be semi-circularly shaped, pyramidally shaped, rounded and preferably rectangular, as shown.

In FIG. 4 the neck 2 of the drilling and chipping tool 1 is displayed and the holder 3 can be mounted on the neck 2 with a part 5a of the interior teeth 5, 5a being offsettable in the circumferential direction. Recess 2b in the neck 2 extends circumferentially of the neck, note FIG. 4. Recess 2b can be shaped to correspond to the shape of the locking parts 5a of the interior teeth 5, 5a.

Another holder 13 to be mounted on the neck of the tool 1 is shown in FIGS. 5-7. Cap 14 has interior teeth 15, 15a extending in the long direction of the tool and the neck 12, note FIG. 8, of the tool has exterior teeth 12a extending in the long direction and arranged to match the interior teeth 15, 15a.

During assembly, the holder 13 and the cap 14 with the interior teeth 15, 15a is slid onto the exterior teeth 12a of the neck 12 until the neck bears against a stop 23 formed on the holder 13.

For movement of the offsettable parts 15a of the interior teeth 15, 15a in the radial direction inwardly, the holder includes an exterior ring or annulus 16 in the region of the cap 14, and an interior ring 17 supporting the interior teeth 15, 15a. The exterior ring 16 is rotatable in the circumferential direction relative to the interior ring 17 forming the trailing end of the holder 13. Exterior ring 16 has radially inwardly directed projections 16a in the form of rounded faces defining a interior diameter less than the interior diameter of the ring 16 and corresponding to the offsettable interior teeth 15a. When the ring 16 is rotated in the circumferential direction, the inwardly directed projections 16a press the restoring springs 19 and the offsettable interior teeth 15a radially inwardly toward the center or axis of the cap 14. Accordingly, the interior teeth 15a are pressed radially inwardly into engagement with recesses 12b in the neck 12 and thereby lock the holder 13.

Return spring 19 is solidly connected with the offsettable interior teeth 15a by way of a pocket-shaped recess 20 in the radially outer surface of the teeth 15a. The recess 20 is located opposite the offsettable tooth 15a of the interior teeth 15, 15a and preferably extends in the same direction as the tooth. The recess 20 extends across the entire displaceable interior tooth 15a. The radially outer opening of the recess 20 has a width smaller than the base of the recess.

Return spring 19 has a shaped portion of precisely the same shape as the recess 20 and can be inserted in the long direction of the tool into the recess. With the return spring 19 fixed in a radial direction within the recess 20, the radially inwardly displacement of the interior teeth 15a is assured.

In addition, extending in the circumferential direction from both sides of the shaped part of the return spring 19 are two wing-like ends bearing against the exterior circumference of the inner ring 17. The inner ring 17 includes the interior teeth 15, 15a on its radially inner surface. Accordingly, it is assured that without the engagement of the projections 16a with the return springs 19, the offsettable interior teeth 15a are displaced radially outwardly and do not engage in the recess 12b in the neck 12.

The holder 13 is formed partly of plastics material with the remaining parts formed essentially of metal, aluminum or rubber.

FIG. 6 shows an end view of the holder 13 taken in the direction of the arrow VI in FIG. 5. A part of cap 14 is shown in section. The interior teeth 15, 15a have a width or circumferential dimension C, note FIG. 5. The offsettable interior teeth 15a have a length B in the long direction of the tool corresponding to a third of the overall tooth length L and the offsettable teeth 15a are arranged in the central third of the overall tooth length L.

The cross-section of a single tooth of the interior teeth 15, 15a on the holder 13 as well as of the exterior teeth 12a on the neck 12 can be semi-circularly shaped, pyramidally-shaped, rounded, and preferably rectangularly shaped.

FIG. 7 is an enlarged partial view of the encircled part VII of FIG. 6. The radially offsettable parts 15a of the interior teeth include an essentially curve shaped recess 20. Recess 20 is aligned with the tooth 15a and extends inwardly from the radially outer surface of the part of the ring 17 forming the tooth 15a. Recess 20 mounts a return or restoring spring 19. The outer ring 16 has at least one inwardly directed projection 16a on its inner surface. By turning the ring 16 in the circumferential direction, the projection 16a contacts the return spring 19 in alignment with the recess 20, whereby the part of the ring 17 forming the tooth 15a is offset radially inwardly by an amount H corresponding to the radial dimension of the tooth and displaces the tooth into the locked position. By rotating the outer ring 16 in the opposite direction the projection 16a is moved out of engagement with the part of the spring 19 extending into the recess 20. The free space in which the rotation of the ring 16 is possible, is defined by the length of a recess 22 in which at least one cam 21 is movable. The return spring 19 causes a pull tack or return of the offsettable tooth 15a into the initial or unlocked position.

FIG. 8 displays a neck 12 of a drilling or chipping tool 1 on which the holder 13 including the radially inwardly offsettable teeth 15a are arranged. Neck 12 has a recess 12b extending in the circumferential direction of the neck and located between every other one of the teeth 12. Recesses 12b can be arranged in the region of each one of the teeth to correspond to the arrangement of the radially offsettable parts.

A continuous circumferentially extending recess, such as shown in FIG. 4, can also be used.

Since the entire interior teeth 15a are displaceable radially inwardly, the shape of the entire portion must be taken into account in designing the shape of the recess 12b.

While specific embodiments of the invention have been shown and described in detail to illustrate the application of the inventive principles, it will be understood that the invention may be embodied otherwise without departing from such principles.

I claim:

1. Drilling and chipping tool having a leading end and a trailing end and a long direction extending in the trailing end - leading end direction, a holder (3, 13) for a tool bit detachably mountable on a neck (2, 12) at the leading end of said tool (1), said holder (3, 13) includes a cap (4, 14) mountable over the neck (2, 12), wherein the improvement comprises that said cap (4, 14) has an annular interior surface with an axis extending in the long direction and with spaced teeth (5, 5a, 15, 15a) formed on and extending inwardly from the interior surface with said teeth extending in the long direction, said neck (2, 12) has an exterior surface with spaced teeth (2a, 12a) thereon extending in the long direction and being complementary to said teeth (5, 5a, 15, 15a) on said cap (4, 14), a part (5a, 15a) of said teeth (5, 5a, 15, 15a) on said cap (4, 14) being offsettable relative to the remainder of said teeth (5, 15), and at least one recess (2b, 12b) in the region of the teeth (2a, 12a) on the exterior surface of said neck (2, 12) and arranged to receive the offsettable part (5a, 15a) of said teeth (5, 5a, 15, 15a) on said cap (4, 14).

2. Drilling and chipping tool, as set forth in claim 1, wherein the offsettable part (5a) of the interior teeth (5a, 5b) is rotatable in the circumferential direction relative to the remainder of the interior teeth (5).

3. Drilling and chipping tool, as set forth in claim 1, wherein the movement in the circumferential direction of the offsettable part (5a) corresponds approximately to the width or circumferential dimension of one of the teeth (5a).

4. Drilling and chipping tool having a leading end and a trailing end and a long direction extending in the trailing end - leading end direction, a holder (3, 13) for a tool bit detachably mountable on a neck (2, 12) at the leading end of said tool (1), said holder (3, 13) includes a cap (4, 14) mountable over the neck (2, 12) wherein the improvement comprises that said cap (4, 14) has an annular interior surface with an axis extending in the long direction and with spaced teeth (5, 5a, 15, 15a) formed on and extending inwardly from the interior surface with said teeth extending in the long direction, said neck (2, 12) has an exterior surface with spaced teeth (2a, 12a) thereon extending in the long direction and being complementary to said teeth (5, 5a, 15, 15a) on said cap (4, 14), a part (5a, 15a) of said teeth (5, 5a, 15, 15a) on said cap (4, 14) being offsettable relative to the remainder of said teeth (5, 15), and at least one recess (2b, 12b) in the region of the teeth (2a, 12a) on the exterior surface of said neck (2, 12) and arranged to receive the offsettable part (5a, 15a) of said teeth (5, 5a, 15, 15a) on said cap (4, 14), the offsettable part (15a) of the interior teeth (15, 15a) is radially inwardly displaceable with respect to the remainder of the teeth (15).

5. Drilling and chipping tool, as set forth in claim 4, wherein the radially inward movement of the offsettable part (15a) of the interior teeth (15, 15a) corresponds to a radial dimension (H) of one of the teeth (15a).

6. Drilling and chipping tool having a leading end and a trailing end and a long direction extending in the trailing end - leading end direction, a holder (3, 13) for a tool bit detachably mountable on a neck (2, 12) at the leading end of said tool (1), said holder (3, 13) includes a cap (4, 14) mountable over the neck (2, 12) wherein the improvement comprises that said cap (4, 14) has an annular interior surface with an axis extending in the long direction and with spaced teeth (5, 5a, 15, 15a) formed on and extending inwardly from the interior surface with said teeth extending in the long direction, said neck (2, 12) has an exterior surface with spaced teeth (2a, 12a) thereon extending in the long direction and being complementary to said teeth (5, 5a, 15, 15a) on said cap (4, 14), a part (5a, 15a) of said teeth (5, 5a, 15, 15a) on said cap (4, 14) being offsettable relative to the remainder of said teeth (5, 15), and at least one recess (2b, 12b) in the region of the teeth (2a, 12a) on the exterior surface of said neck (2, 12) and arranged to receive the offsettable part (5a, 15a) of said teeth (5, 5a, 15, 15a) on said cap (4, 14), the dimension in the long direction of the offsettable part (5a, 15a) of the interior teeth (5, 5a, 15, 15a) corresponds to one third of the overall length of the teeth in the long direction.

* * * * *